(12) United States Patent
Nun

(10) Patent No.: US 6,700,889 B1
(45) Date of Patent: Mar. 2, 2004

(54) HIGH SPEED APPARATUS AND METHOD FOR CLASSIFYING A DATA PACKET BASED ON DATA VALUES CONTAINED IN THE DATA PACKET

(75) Inventor: Michael Ben Nun, Ramat Hasharon (IL)

(73) Assignee: P-Cube Ltd., Herzelia (IL)

( * ) Notice: Subject to any disclaimer, the term of this patent is extended or adjusted under 35 U.S.C. 154(b) by 0 days.

(21) Appl. No.: 09/515,848

(22) Filed: Feb. 29, 2000

(51) Int. Cl.[7] .............................................. H04L 12/56
(52) U.S. Cl. ........................ 370/392; 370/471; 370/475
(58) Field of Search ................................ 370/389, 392, 370/400, 401, 464, 465, 469, 471, 475; 709/370, 238

(56) References Cited

U.S. PATENT DOCUMENTS 5,951,651 A  * 9/1999 Lakshman et al. .......... 709/239
6,307,855 B1 * 10/2001 Hariguchi ................... 370/392
6,529,508 B1 *  3/2003 Li et al. ...................... 370/392
2001/0054140 A1 * 12/2001 Oberman et al. ........... 712/223

* cited by examiner

Primary Examiner—Chau Nguyen
Assistant Examiner—Soon-Dong Hyun
(74) Attorney, Agent, or Firm—Sughrue Mion, PLLC

(57) ABSTRACT

A device for classifying input data based on the values of first and second data of the input data includes a content addressable memory having one or more rows. A first row includes first and second memories, first and second comparators, and a first hit line. The first memory stores second minimum and maximum values defining a second range. The first and second comparators determine whether or not the first and second data fall within the first and second ranges, respectively. The first hit line outputs a first logic value when the first data falls within the first range and the second data falls within the second range. Conversely, the first hit line outputs a second logic value when the first data falls outside the first range or the second data falls outside the second range.

33 Claims, 4 Drawing Sheets

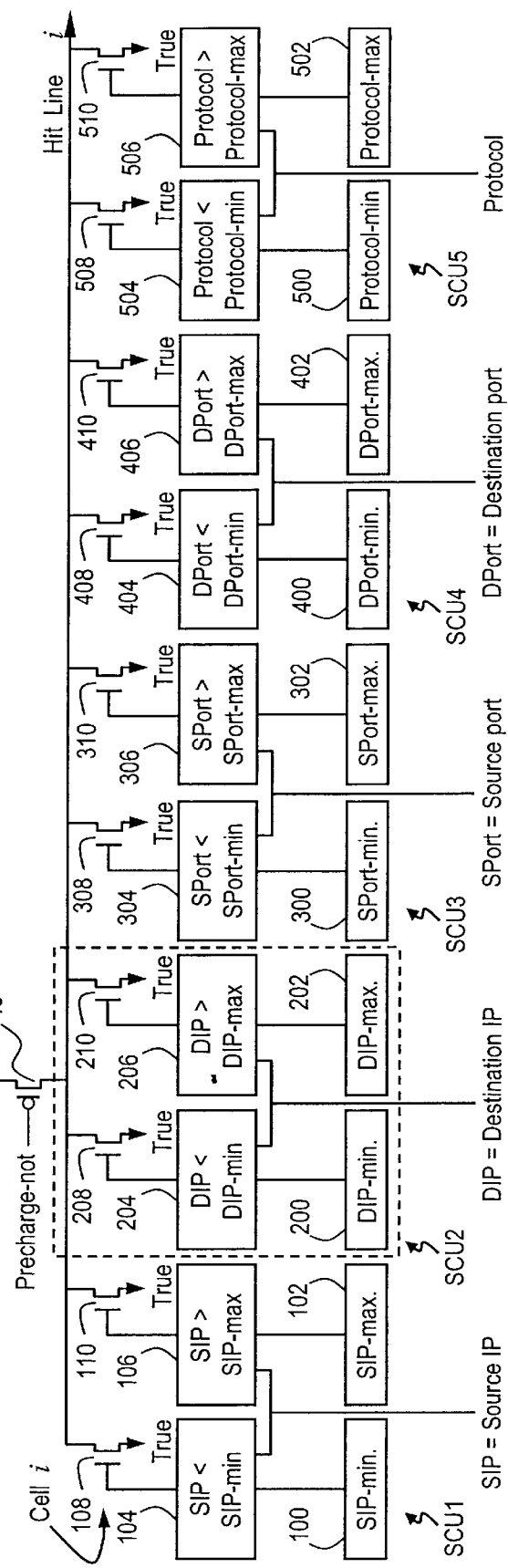

HIGH SPEED APPARATUS AND METHOD FOR CLASSIFYING A DATA PACKET BASED ON DATA VALUES CONTAINED IN THE DATA PACKET

FIELD OF THE INVENTION

The present invention relates to an apparatus that can quickly determine if multiple numbers are respectively contained in multiple numeric ranges. More particularly, the present invention relates to an apparatus that can quickly classify data packets transmitted over a digital communication network at high speeds by quickly determining if data values contained in the data packets are respectively contained in certain data ranges. Furthermore, the present invention relates to a method employed by the apparatus.

BACKGROUND OF THE INVENTION

In many applications, classifying a group of numbers by determining whether or not the group of numbers falls within a specific group of numerical ranges is extremely useful. For example, in a digital communication network (e.g. the internet, wide area network ("WAN"), local area network ("LAN"), etc.), data packets are transmitted over the network between a source computer (e.g. a router, server, etc.) and a destination computer (e.g. a router, server, etc.). Each of the data packets typically includes a header that contains information identifying the type of data contained in the data packet, the source from which the data packet was transmitted, the intended destination of the data packet, etc.

FIG. 1 illustrates an example of a data packet header HDR that comprises a source internet protocol ("IP") address field 2, a destination IP address field 4, a protocol field 6, a source port field 8, and a destination port field 10. The source IP address field 2 contains a 32-bit source IP address that identifies the computer transmitting the data packet. The destination IP address field 4 contains a 32-bit destination address that identifies the intended destination of the data packet. The protocol field 6 contains eight bits of protocol data that identify the data format and/or the transmission format of the data contained in the data packet. The source port field 8 includes 16 bits of data that identify the computer port that physically outputs the data packet, and the destination port field 10 contains 16 bits of data that represent the computer port that is supposed to input the data packet.

When data packets are transmitted over the network from the source computer to the destination computer, they are input by various routers, firewalls, and other network components. Such components may be included in the destination computer and/or may be contained in an intermediate computer that processes the data as it is being transmitted from the source computer to the destination computer. Before processing the data packet, a network component must "classify" the data packet according to various characteristics of the data packet and/or the data contained in the packet. Then, the network component processes the data packet based on its classification.

A data packet is usually classified by evaluating the information contained in the data packet header. For example, if the data packet contains the header HDR shown in FIG. 1, a network component may classify the data packet as a first type of data packet if the source IP address falls within a first range of source IP addresses, the destination IP address falls within a first range of destination IP addresses, the protocol data falls within a first range of protocol data values, the source port data falls within a first range of source port data values, and the destination port data falls within a first range of destination port data values. On the other hand, the internet component may classify the data packet as a second type of data packet if the source IP address, destination IP address, protocol data, source port data, and destination port data respectively fall within a second range of source IP addresses, a second range of destination IP addresses, a second range of protocol data values, a second range of source port data values, and a second range of destination port data values. Each group of data value ranges by which a data packet is classified may be considered to be a "rule". Thus, in the example above, the data packet is classified as a first type of data packet if it satisfies a first rule and is classified as a second type of data packet if it satisfies a second rule.

After the data packet is classified, the network component is able to determine how handle or process the data. For instance, based on the classification of the data packet, the network component may output the data packet via a particular transmission path so that it quickly reaches the intended destination computer, may determine that the data packet is authorized to be received and further processed by the internet component, may prevent the packet from being forwarded on the network, may process the data contained in the data packet in a particular manner, etc. Accordingly, the network component acts as a filter that classifies incoming data packets according to various rules based on the specific data values contained in the data packet headers and then processes the data packets based on their classification.

Since the network component must classify each and every data packet that it receives, it should ideally classify the data packets at a speed that equals at least the speed at which the data packets are received. By classifying the data packets as quickly as they are received, data packets do not become "bottlenecked" at the input of the internet component, and the overall operational speed of the network is not degraded.

Currently, high speed Sonet and Ethernet networks are capable of transmitting data at speeds of one gigabit per second and are widely implemented in LANs and WANs. Furthermore, fiber optic networks capable of transmitting data at speeds of ten gigabits per second are expected to be developed soon. Moreover, interconnects that can transmit data at 40 gigabits per second are currently being tested and will additionally increase the overall speed at which data travels over the LANs and WANs. In light of the present and foreseeable transmission speeds of data networks, network components must be able to classify and filter data packets at extraordinary speeds. For example, on a high speed Sonet network that is capable of transmitting ten gigabits per second, data packets can be transmitted at a rate of 30 million packets per second, and on a full duplex line, data packets can be transmitted at about 60 million packets per second.

As described above, network components classify each incoming data packet by evaluating its header and selecting a rule from among multiple rules that corresponds to the data in the header. Furthermore, a typical component uses hundreds of rules to classify data packets. Thus, in order to properly classify the incoming data packets without creating a bottleneck at the input of the network component, the component must determine which rule of the hundreds of rules corresponds to each of the incoming data packets and must make such determination at a very high speed. Furthermore, as the number of network users and the number of different services available on the network increase, the number of rules that will need to be evaluated by standard network components is expected to grow to ten thousand or more in the near future. As a result, the network components will need to classify data packets according to an extremely large number of rules at incredible speeds.

One proposal for designing network components to classify data packets is to combine dedicated hardware and conventional central processing units ("CPUs"). However, such a design requires hundreds of CPUs that are each capable of executing more than one billion instructions per second. Furthermore, as the number of rules that need to be evaluated and the speed at which the rules must be evaluated increase, designing a network component in the proposed manner will be impractical because the speed of the CPUs will be too slow and the overall cost of the network component will become extremely expensive.

Also, some network components suggest using a combination of dedicated hardware and processing elements, such as the components described in the following article: Stiliadis, D. "High-Speed Policy-Based Packet Forwarding Using Efficient Multi-Dimensional Range Matching" ACM SIGCOMM 1998 published in February 1998. The processing elements disclosed in the article are fairly simple and can basically be implemented with a comparator and a state machine. However, each field of the data packet header requires its own processing element, and a particular device disclosed in the article evaluates data packet headers having five fields and comprises five 128 Mbit synchronous static random access memories ("SRAMs") and one field programmable gate array ("FPGA"). The particular device is able to classify data packets based on up to 512 rules and is able to process one million packets per second in a worst case scenario.

However, the device disclosed in the article above has many disadvantages. For example, the amount of memory required by the device increases exponentially as the number of rules to be evaluated increases. In addition, the number of times that the memory of the device must be accessed increases linearly as number of rules increases. Therefore, in practical operations, the disclosed device is only capable of evaluating approximately 1,000 rules for data packets having headers with five fields or less.

The use of content addressable memories ("CAMs") for detecting if one or more data values equal one or more predetermined values is well known. Such memories have been used in memory management systems for converting virtual addresses to physical addresses. In addition, U.S. Pat. No. 5,745,488 (invented by Thompson et al.) discloses evaluating a data packet by using a CAM and is incorporated herein by reference for all purposes. However, in the above patent, the CAM can only compares the data values contained in the packet with individual data values and cannot compare the data values with ranges of values. Thus, the CAM cannot be used in many advanced network components that require sophisticated classification of data packets based on predetermined ranges of values. Since the classification capabilities of the CAM is limited, the CAM cannot practically classify a data packet by evaluating a header having more than five fields and by comparing the header to more than 1,000 rules.

SUMMARY OF THE INVENTION

One object of the present invention is to provide an apparatus that can quickly and accurately classify data packets according to a large number of rules.

Another object of the present invention is to provide an apparatus that can quickly classify data packets without using a processor that executes time consuming processing routines.

Yet another object of the present invention is to provide an apparatus in which the time required to classify data packets does not substantially increase as the number of rules used to classify the data packets increases.

In order to achieve the above and other objects, a device for classifying input data is provided and comprises: a first memory unit that stores a first maximum data value and a first minimum data value, wherein said first maximum data value and said first minimum data value define a first data range; and a first comparison circuit that inputs first data, said first minimum data value, and said first maximum data and determines a first relationship between said first data and said first data range, wherein said first comparison circuit outputs a first comparison signal based on said first relationship, wherein said first data corresponds to at least a first portion of said input data, and wherein said first comparison signal corresponds to a classification of said input data.

In order to further achieve the above and other objects, a classification device for classifying input data comprising first data and second data is provided. The classification device comprises: a first memory unit that stores a first maximum data value and a first minimum data value, wherein said first maximum data value and said first minimum data value define a first data range; a second memory unit that stores a second maximum data value and a second minimum data value, wherein said second maximum data value and said second minimum data value define a second data range; a first comparison circuit that inputs said first data, said first minimum data value, and said first maximum data value, determines whether or not said first data and said first data range have a first predetermined relationship, and outputs a corresponding first comparison signal; a second comparison circuit that inputs said second data, said second minimum data value, and said second maximum data value and determines whether or not said second data and said second data range have a second predetermined relationship, wherein said second comparison circuit outputs a second comparison signal when said second data and said second data range have said second predetermined relationship; and a first hit line, wherein said first hit line is coupled to said first comparison circuit and said second comparison circuit and is forced to a first logical value when said first comparison signal indicates that said first predetermined relationship is not satisfied or said second comparison signal indicates that said second predetermined relationship is not satisfied, wherein said first memory unit, said second memory unit, said first comparison circuit, said second comparison circuit, and said first hit line define a first cell of said classification device, wherein said first predetermined relationship and said second predetermined relationship define a first classification rule of said first cell, and wherein said classification device does not classify said input data according to said first classification rule when said first hit line has said first logical value and classifies said input data according to said first classification rule when said first hit line has a second logical value.

In order to even further achieve the above and other objects, a classifying device for receiving input data that comprises first data and second data and for classifying said input data based on the values of said first data and said second data is provided. The classifying device comprises: a content addressable memory that comprises a first row and a second row, wherein said first row includes: a first memory unit that stores a first minimum value and a first maximum value defining a first range; a first compare circuit coupled to said first memory unit; a second memory unit that stores a second minimum value and a second maximum value defining a second range; and a second compare circuit coupled to said second memory unit, wherein said second row includes: a third memory unit that stores a third minimum value and a third maximum value defining a third range; a third compare circuit coupled to said third memory unit; a fourth memory unit that stores a fourth minimum value and a fourth maximum value defining a fourth range; and a fourth compare circuit coupled to said fourth memory unit, wherein said first compare circuit inputs said first maximum and minimum values and said first data and determines whether or not said first data and said first range have a first relationship, wherein said second compare circuit inputs said second maximum and minimum values and said second data and determines whether or not said second data and said second range have a second relationship, wherein said third compare circuit inputs said third maximum and minimum values and said first data and determines whether or not said first data and said third range have a third relationship, and wherein said fourth compare circuit inputs said fourth maximum and minimum values and said second data and determines whether or not said second data and said fourth range have a fourth relationship.

BRIEF DESCRIPTION OF THE DRAWINGS

The above and other objects and advantages of the present invention will become more apparent by describing in detail preferred embodiments thereof with reference to the attached drawings in which:

FIG. 1 illustrates an example of the format of a header of a data packet;

FIG. 2 illustrates an example of the structure of a cell of a modified content addressable memory ("MCAM") in accordance with a first embodiment of the present invention;

DETAILED DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that would have been known to one skilled in the art are omitted for the sake of clarity and brevity.

The present invention relates to a device that classifies a group of numbers according to predetermined rules. In an illustrative, non-limiting embodiment, the present invention uses a modified content addressable memory ("MCAM") that classifies incoming data packets at an extremely high speed based on the values of data contained in the headers of the data packets.

Figure 3:
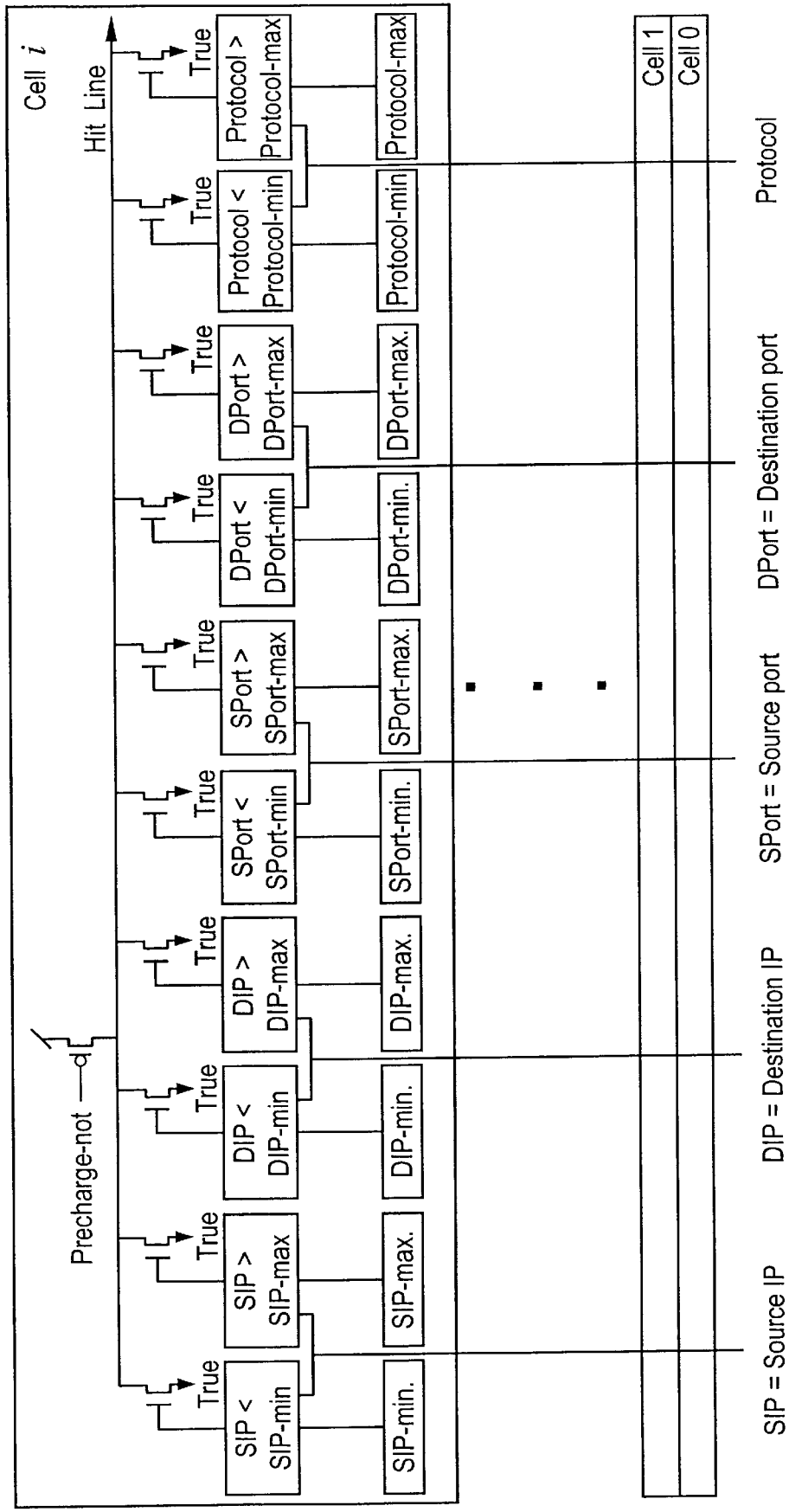
FIG. 3 illustrates an example of the structural relationship of a plurality of cells within the MCAM in accordance with the first embodiment of the present invention.

FIGS. 2 and 3 show an example of the structure of an MCAM 20 that classifies incoming data packets having headers that have the same format as the header HDR shown in FIG. 1. The MCAM 20 contains a plurality of rows or cells 0 to i that are connected to hit lines 0 to i, respectively, and as shown in FIG. 2, the cell i contains five span compare units SCU1 to SCU5. Although five units SCU1 to SCU5 are shown in the illustrative embodiment, the cell i clearly can have more or less than the five units SCU1 to SCU5.

The span compare unit SCU1 contains a minimum source IP register 100, a maximum source IP register 102, a first source IP comparator 104, a second source IP comparator 106, and two pull down transistors 108 and 110. The register 100 stores a minimum source IP address, and the register 102 stores a maximum source IP address. The comparator 104 inputs the minimum source IP address and the source IP address contained in the field 2 of the data packet header HDR (FIG. 1), outputs a logic "1" if the source IP address is less than the minimum source IP address, and outputs a logic "0" if the source IP address is greater than or equal to the minimum source IP address. When the comparator 104 outputs a logic "1", the transistor 108 turns ON to connect the hit line i to ground, and when the comparator 104 outputs a logic "0", the transistor 108 turns OFF to isolate the hit line i from ground. Similarly, the comparator 106 inputs the maximum source IP address and the source IP address contained in the field 2 of the header HDR, outputs a logic "1" if the source IP address is greater than the maximum source IP address, and outputs a logic "0" if the source IP address is less than or equal to the maximum source IP address. When the comparator 106 outputs a logic "1", the transistor 110 turns ON to connect the hit line i to ground, and when the comparator 106 outputs a logic "0", the transistor 110 turns OFF to isolate the hit line i from ground.

The span compare unit SCU2 contains a minimum destination IP register 200, a maximum destination IP register 202, a first destination IP comparator 204, a second destination IP comparator 206, and two pull down transistors 208 and 210. The register 200 stores a minimum destination IP address, and the register 202 stores a maximum destination IP address. The comparator 204 inputs the minimum destination IP address and the destination IP address contained in the field 4 of the header HDR, outputs a logic "1" if the destination IP address is less than the minimum destination IP address, and outputs a logic "0" if the destination TP address is greater than or equal to the minimum destination IP address. When the comparator 204 outputs a logic "1", the transistor 208 turns ON to connect the hit line i to ground, and when the comparator 204 outputs a logic "0", the transistor 208 turns OFF to isolate the hit line i from ground. Similarly, the comparator 206 inputs the maximum destination IP address and the destination IP address contained in the field 4 of the header HDR, outputs a logic "1" if the destination IP address is greater than the maximum destination IP address, and outputs a logic "0" if the destination IP address is less than or equal to the maximum destination IP address. When the comparator 206 outputs a logic "1", the transistor 210 turns ON to connect the hit line i to ground, and when the comparator 206 outputs a logic "0", the transistor 210 turns OFF to isolate the hit line i from ground.

The span compare unit SCU3 contains a minimum source port register 300, a maximum source port register 302, a first source port comparator 304, a second source port comparator 306, and two pull down transistors 308 and 310. The register 300 stores a minimum source port value, and the register 302 stores a maximum source port value. The comparator 304 inputs the minimum source port value and the source port data contained in the field 8 of the header HDR, outputs a logic "1" if the source port data is less than the minimum source port value, and outputs a logic "0" if the source port data is greater than or equal to the minimum source port value. When the comparator 304 outputs a logic "1", the transistor 308 turns ON to connect the hit line i to ground, and when the comparator 304 outputs a logic "0", the transistor 308 turns OFF to isolate the hit line i from ground. Similarly, the comparator 306 inputs the maximum source port value and the source port data contained in the field 8 of the header HDR, outputs a logic "1" if the source port data is greater than the maximum source port value, and outputs a logic "0" if the source port data is less than or equal to the maximum source port value. When the comparator 306 outputs a logic "1", the transistor 310 turns ON to connect the hit line i to ground, and when the comparator 306 outputs a logic "0", the transistor 310 turns OFF to isolate the hit line i from ground.

The span compare unit SCU4 contains a minimum destination port register 400, a maximum destination port register 402, a first destination port comparator 404, a second destination port comparator 406, and two pull down transistors 408 and 410. The register 400 stores a minimum destination port value, and the register 402 stores a maximum destination port value. The comparator 404 inputs the minimum destination port value and the destination port data contained in the field 10 of the header HDR, outputs a logic "1" if the destination port data is less than the minimum destination port value, and outputs a logic "0" if the destination port data is greater than or equal to the minimum destination port value. When the comparator 404 outputs a logic "1", the transistor 408 turns ON to connect the hit line i to ground, and when the comparator 404 outputs a logic "0", the transistor 408 turns OFF to isolate the hit line i from ground. Similarly, the comparator 406 inputs the maximum destination port value and the destination port data contained in the field 10 of the header HDR, outputs a logic "1" if the destination port data is greater than the maximum destination port value, and outputs a logic "0" if the destination port data is less than or equal to the maximum destination port value. When the comparator 406 outputs a logic "1", the transistor 410 turns ON to connect the hit line i to ground, and when the comparator 406 outputs a logic "0", the transistor 410 turns OFF to isolate the hit line i from ground.

Finally, the span compare unit SCU5 contains a minimum protocol data register 500, a maximum protocol data register 502, a first protocol data comparator 504, a second protocol data comparator 506, and two pull down transistors 508 and 510. The register 500 stores a minimum protocol data value, and the register 502 stores a maximum protocol data value. The comparator 504 inputs the minimum protocol data value and the protocol data value contained in the field 6 of the header HDR, outputs a logic "1" if the protocol data value is less than the minimum protocol data value, and outputs a logic "0" if the protocol data value is greater than or equal to the minimum protocol data value. When the comparator 504 outputs a logic "1", the transistor 508 turns ON to connect the hit line i to ground, and when the comparator 504 outputs a logic "0", the transistor 508 turns OFF to isolate the hit line i from ground. Similarly, the comparator 506 inputs the maximum protocol data value and the protocol data value contained in the field 6 of the header HDR, outputs a logic "1" if the protocol data value is greater than the maximum protocol data value, and outputs a logic "0" if the protocol data value is less than or equal to the maximum protocol data value. When the comparator 506 outputs a logic "1", the transistor 510 turns ON to connect the hit line i to ground, and when the comparator 506 outputs a logic "0", the transistor 510 turns OFF to isolate the hit line i from ground.

In addition, the cell i of the MCAM 20 comprises a precharge transistor 40 that selectively couples the hit line i to a voltage source 50. Specifically, the transistor 40 inputs a precharge signal and turns ON when the precharge signal equals a logic "0" to electrically connect the hit line i to the voltage source 50. On the other hand, when the precharge signal equals a logic "1", the transistor 40 is turned OFF and isolates the hit line i from the voltage source 50.

Based on the structure described above, the cell i of the MCAM 20 can quickly determine if the data values contained in the header HDR shown in FIG. 1 fall within the predetermined data ranges defined by the span compare units SCU1 to SCU5. Specifically, the precharge signal is set equal to a logic "0" to turn ON the precharge transistor 40 and precharge the hit line i to a logic "1". Then, the precharge signal is set equal to a logic "1" to turn the transistor OFF to electrically disconnect the hit line i from the voltage source 50. However, after such time, the hit line i remains precharged to a logic "1".

Then, the data in the fields 2, 4, 6, 8, and 10 of the data packet header HDR are supplied to the span compare units SCU1 to SCU5 of the cell i. If the source IP address in the header field 2 does not fall within the range defined by the minimum source IP address stored in the register 100 and the maximum source IP address stored in the register 102, the unit SCU1 connects the hit line i to ground. In particular, if the address is less than the minimum source IP address, the comparator 104 outputs a logic "1" and turns ON the transistor 108 to connect the hit line i to ground. Similarly, if the address is greater than the maximum source IP address, the comparator 106 outputs a logic "1" and turns ON the transistor 110 to connect the hit line i to ground. On the other hand, if the source IP address in the header field 2 is between the minimum and maximum source IP addresses, neither of the transistors 108 and 110 is turned ON, and the span compare unit SCU1 does not connect the hit line i to ground.

The remaining span compare units SCU2 to SCU5 operate similarly to the span control unit SCU1. Specifically, if the destination IP address contained in the header field 4 falls with the range defined by the minimum and maximum destination IP addresses stored in the registers 200 and 202, the SCU2 does not connect the hit line i to ground. On the other hand, if the destination IP address falls outside the range, the unit SCU2 connects the hit line i to ground. Also, if the source port data contained in the header field 8 falls with the range defined by the minimum and maximum source port values stored in the registers 300 and 302, the SCU3 does not connect the hit line i to ground. On the other hand, if the source port data falls outside the range, the unit SCU3 connects the hit line i to ground. Similarly, if the destination port data contained in the header field 10 falls with the range defined by the minimum and maximum destination port values stored in the registers 400 and 402, the SCU4 does not connect the hit line i to ground. On the other hand, if the destination port data falls outside the range, the unit SCU4 connects the hit line i to ground. Finally, if the protocol data contained in the header field 6 falls with the range defined by the minimum and maximum protocol data values stored in the registers 500 and 502, the SCU5 does not connect the hit line i to ground. On the other hand, if the protocol data falls outside the range, the unit SCU5 connects the hit line i to ground.

As described above, if the data in all of the fields 2, 4, 6, 8, and 10 of the header HDR fall in the corresponding data ranges defined by the minimum and maximum data values stored in the scan compare units SCU1 to SCU5 of the cell i, the hit line i is not connected to ground and a logic "1" is output from the hit line i. On the other hand, if any of the data in any of the header fields 2, 4, 6, 8, and 10 falls outside its corresponding data range, the hit line i is connected to ground and outputs a logic "0". The group of data ranges stored in the units SCU1 to SCU5 can be considered to define a rule that is used to classify a data packet. Specifically, the rule represents an i-th type of data packet that (1) has a source IP address between the maximum and minimum addresses stored in the registers 100 and 102, (2) has a destination IP address between the maximum and minimum addresses stored in the registers 200 and 202, (3) is transmitted from a source port between the maximum and minimum source ports stored in the registers 300 and 302, (4) is transmitted to a destination port between the maximum and minimum destination ports stored in the registers 400 and 402, and (5) has protocol data that is between the minimum and maximum protocol data stored in the registers 500 and 502. Thus, when the data from the header HDR of a data packet is input to the cell i of the MCAM 20, the data packet is classified as the i-th type of data packet if the hit line i equals a logic "1" and is not classified as the i-th type of data packet if the hit line i equals a logic "0".

In addition to being input to the cell i of the MCAM 20, the data in the header HDR is also simultaneously input to the remaining cells 0 to i−1. Furthermore, the cells 0 to i−1 operate similarly to the cell i described above, except that they correspond to different rules representing different types of data packets (i.e. zeroth to (i−1)th types of data packets). Clearly, the cells 0 to i−1 can easily be designed to correspond to different rules by changing the maximum and minimum data values stored in the various span compare units contained in each of the cells 1 to i−1. As a result, when the header HDR of a data packet is input to the MCAM 20, the MCAM 20 quickly classifies the data packet as a zeroth to i-th type of data packet and outputs a logic "1" from one or more of the hit lines 0 to i based on the classification. Furthermore, the maximum and minimum data values stored in the span compare units are user-definable, and thus, a user can easily change the classification rules of the MCAM 20 by merely changing the values of the stored data. Thus, the user can easily modify the MCAM 20 to operate in many different network applications and environments that handle many different types of data packets.

Figure 5:
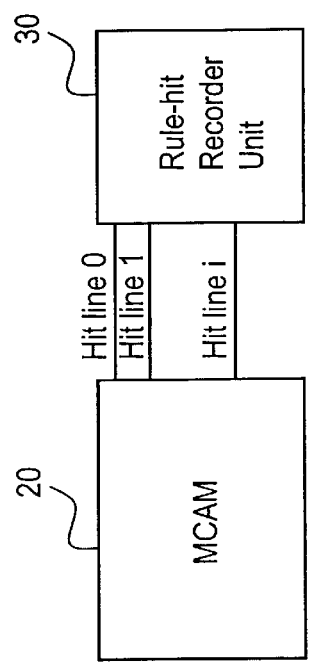
FIG. 5 illustrates an example of the interconnection between the MCAM and a rule-hit recorder unit in accordance with the first embodiment of the present invention.

As shown in FIG. 5, the MCAM 20 is coupled to a rule-hit recorder ("RHR") unit 30. After each data packet is classified by the MCAM 20, the RHR unit 30 evaluates the data on the hit lines 0 to i and determines how to process the data packet. For example, if the data packet is classified as a fifth type of data packet, the MCAM 20 outputs a logic "1" only on the hit line 5. In response, the RHR unit 30 instructs various components in the system to process the data packet as a fifth type of data packet. On the other hand, if the data packet is classified as a second, fourth, and ninth type of data packet, the RHR unit 30 instructs various components in the system to process the data packet as a second, fourth, and ninth type of data packet. In addition, the RHR unit 30 may prioritize the classification of the data packets by prioritizing the hit lines 0 to i according to some predetermined or user defined priority scheme. For example, if the MCAM 20 outputs a logic "1" on the hit lines 2, 4, and 9, the data packet is classified as the second, fourth, and ninth type of data packet. However, if the hit line 2 has the highest priority of the hit lines 2, 4, and 9, the RHR unit 30 will instruct various components to only process the data packet as the second type of data packet. In an alternative embodiment, the RHR unit 3 may instruct the various components to first process the data packet as the second type of data packet and then to sequentially process the data packet as the fourth and ninth type of data packet based on the priority scheme.

In the MCAM 20 described above, the cells 0 to i (e.g. 0 to 999) can be designed so that they classify data packets according to i+1 rules (e.g. 1000 rules). However, in many applications, data packets do not need to be classified according to i+1 rules but only need to be classified according to less than i+1 rules (e.g. 600 rules). If the MCAM 20 contains 1000 cells and is used in an application in which data packets only need to be categorized based on 600 rules, 400 cells of the MCAM 20 are not used. Thus, the 400 unused cells should preferably be deactivated to ensure that they never output a logic "1" on their associated hit lines, because otherwise, the RHR unit 3Q may erroneously cause the data packets to be improperly processed.

One method of deactivating an unused cell is to store a data range in one or more of the scan compare units of the unused cell that cannot possibly encompass any of the potential values of the data in the corresponding header field of a data packet. For example, if the cell i shown in FIG. 2 is an unused cell, it can be deactivated by setting the value of the minimum source IP address stored in the register 100 to a value that is higher than the maximum possible value of the source IP address contained in the header field 2. In such a case, the value of the address in the header field 2 will never exceed the minimum source IP address stored in the register 100, and the hit line i will always be connected to ground. Similarly, the cell i can be deactivated by setting the value of the maximum source IP address stored in the register 102 to a value that is lower than the minimum possible value of the source IP address contained in the header field 2. In such instance, the value of the address in the header field 2 will never be smaller that the maximum source IP address stored in the register 102, and the hit line i will always be connected to ground.

On the other hand, the cell i could be deactivated by setting the minimum data value stored in a scan compare unit to a value that is greater than the maximum data value stored in the unit. For example, if all "1's" are stored in the register 100 as the minimum source IP address and all "0's" are stored in the register 102 as the maximum source IP address, providing a source IP address that is less than all "1's" but greater than all "0's" is impossible. As a result, no source IP address contained in the header field 2 of any data packet can "fall within" the data range defined by the unit SCU1, and thus, the unit SCU1 will always connect the hit line i to ground.

Another manner in which the cell i can be deactivated is to store a deactivation bit in the cell i such that the hit line i is forced to equal a logic "0" when the deactivation bit equal a first value (e.g. a logic "0") and that the hit line i is not forced to a logic "0" when the deactivation bit equals a second value (e.g. a logic "1"). In one embodiment, the cell i comprises a deactivation transistor (not shown) and a deactivation register (not shown). The deactivation register stores the deactivation bit, and the deactivation transistor is connected between the hit line i and ground and is turned ON and OFF based on the value of the bit stored in the register. Thus, when the deactivation bit in the register equals a logic "0" to deactivate the cell i, the deactivation transistor is turned ON and the hit line i is connected to ground and forced to output a logic "0". On the other hand, when the deactivation bit equals a logic "1", the deactivation transistor is turned OFF and isolates the hit line i from ground. As a result, the data output from the hit line i is based on the operation of the span compare units SCU1 to SCU5.

Figure 6:
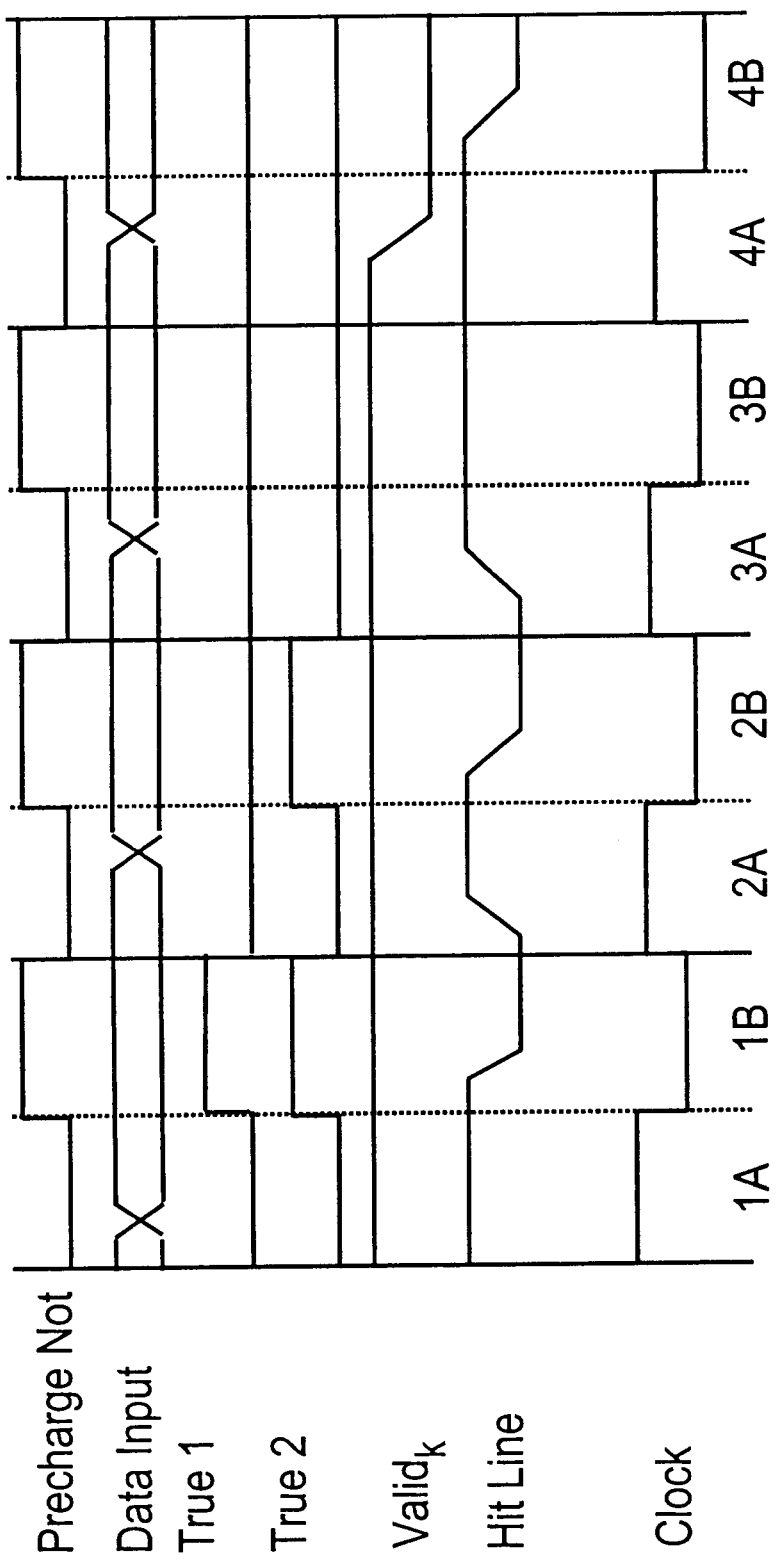
FIG. 6 is a waveform diagram illustrating an example of the operation of the MCAM shown in FIG. 2.

FIG. 6 is a waveform diagram of various signals input to and output from the cell i of the MCAM 20 during four sequential classification operations performed by the cell i. The first classification operation is performed during the first period of a clock signal (i.e. during the time periods 1A and 1B), the second classification operation is performed during the second period of the clock signal (i.e. during the time periods 2A and 2B), the third classification operation is performed during the third period of the clock signal (i.e. during the time periods 3A and 3B), and the fourth classification operation is performed during the fourth period of the clock signal (i.e. during the time periods 4A and 4B).

During the first half of the first classification operation (i.e. during the time period 1A), the precharge signal supplied to the precharge transistor 40 is set to a logic "0". As a result, the hit line i is precharged to a logic "1". Also, during the time period 1A, data from the header HDR of a first data packet is input to the scan compare units SCU1 to SCU5 of the cell i. Then, during the second half of the first classification operation (i.e. during the time period 1B), the precharge signal is set to a logic "1" to isolate the hit line i from the from the supply voltage 50. In addition, at the beginning of the time period 1B, the scan compare units SCU1 to SCU5 determine if the data from the fields 2, 4, 6, 8, and 10 of the packet header HDR fall within the data ranges stored in the units SCU1 to SCU5. As a result of the comparisons, the scan compare units SCU1 and SCU2 determine that the data does not fall within their corresponding data ranges. (In the diagram, the signal TRUE1 equals a logic "1" when the data in the header field 2 does not fall within the data range stored in the unit SCU1 (i.e. when either of the comparators 104 and 106 outputs a logic "1"). Also, the signal TRUE1 equals a logic "0" when the data in the header field 2 falls within the data range (i.e. when both of the comparators 104 and 106 output a logic "0"). Similarly, the signal TRUE2 equals a logic "1" when the data in the header field 4 does not fall within the data range stored in the unit SCU2 and equals a logic "0" when the data in the field 4 falls within the data range. Also, in describing the operation of the MCAM 20 in conjunction with FIG. 6, the data in the header fields 6, 8, and 10 are assumed to always fall within the data ranges stored in the corresponding scan compare units SCU3 to SCU5. Thus, waveforms corresponding to the comparison results of the units SCU3 to SCU5 are omitted for the sake of clarity and brevity). Since the data in the header fields 2 and 4 do not fall within the data ranges stored in the units SCU1 and SCU2, both units SCU1 and SCU2 electrically connect the hit line i to ground.

Then, during the first half of the second classification operation (i.e. during the time period 2A), the precharge signal supplied to the precharge transistor 40 is set to a logic "0", and the hit line i is precharged to a logic "1". Also, during the time period 2A, data from the header HDR of a second data packet is input to the scan compare units SCU1 to SCU5 of the cell i. Then, during the second half of the second classification operation (i.e. during the time period 2B), the precharge signal is set to a logic "1", and the scan compare units SCU1 to SCU5 perform the comparison operation between the data in header HDR and the data ranges stored in the units SCU1 to SCU5. As a result of the comparisons, the scan compare unit SCU1 determines that the data in the field 2 falls within its data range (i.e. the signal TRUE1 equals a logic "0"), and the unit SCU2 determines that the data in the field 4 does not fall within its data range (i.e. the signal TRUE2 equals a logic "1"). Thus, the unit SCU2 electrically connects the hit line i to ground.

During the first half of the third classification operation (i.e. during the time period 3A), the hit line i is precharged to a logic "1", and the data from the header HDR of a third data packet is input to the scan compare units SCU1 to SCU5 of the cell i. Then, during the second half of the third classification operation (i.e. during the time period 3B), the precharge signal is set to a logic "1", and the scan compare units SCU1 to SCU5 determine if the data in the header HDR fall within their corresponding data ranges. As a result of the comparisons, the units SCU1 and SCU2 (and the units SCU3 to SCU5) determine that the data in the header fields fall within their corresponding data ranges. As a result, the signals TRUE1 and TRUE2 equal a logic "0", and neither of the units SCU1 and SCU2 (and none of the units SCU3 to SCU5) electrically couple the hit line i to ground. In other words, the cell i determines that the third data packet is an i-th type of data packet.

During first half of the fourth classification operation (i.e. during the time period 4A), the deactivation bit stored in the deactivation register of the cell i is set to a logic "0". Accordingly, the hit line i is forced to equal a logic "0", regardless of the results of any comparison operations of the scan compare units SCU1 and SCU5 of the cell i.

As shown in FIG. 6, the pull down transistors 108, 110, 208, 210, 308, 310, 408, 410, 508, and 510 are preferably forced to an OFF state when the precharge transistor 40 is turned ON. Otherwise, if the precharge transistor 40 and any one of the pull down transistors 108, 110, 208, 210, 308, 310, 408, 410, 508, and 510 are simultaneously turned on, a short circuit would exist in the cell i, and various components of the MCAM 20 could be damaged.

Figure 4:
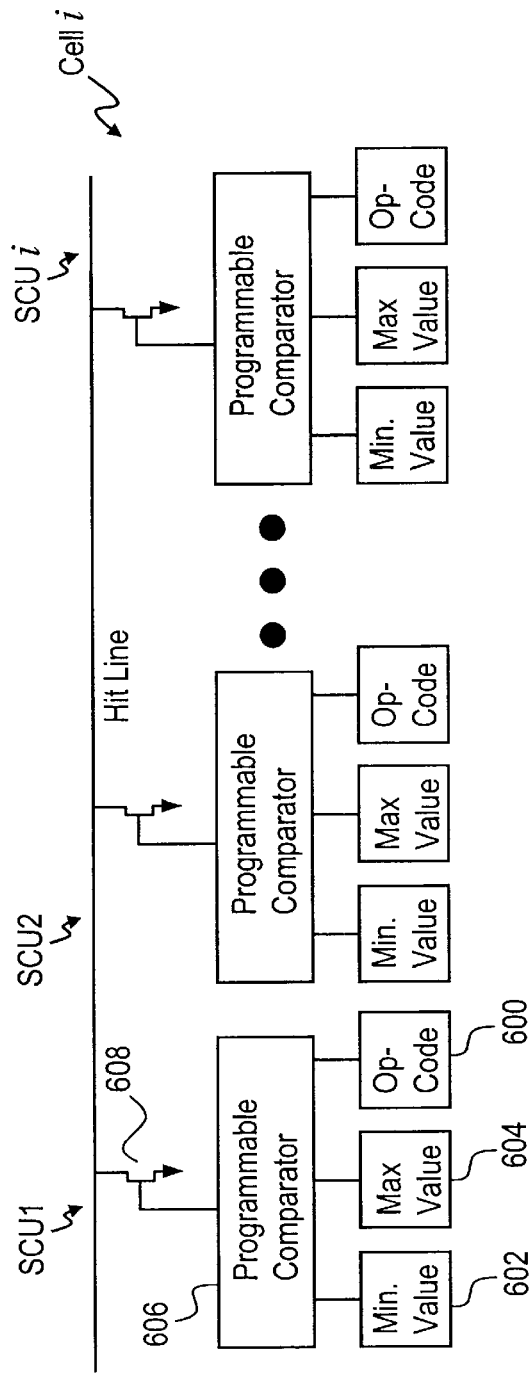
FIG. 4 illustrates an example of the structure of a cell of an MCAM in accordance with a second embodiment of the present invention.

Another embodiment of the MCAM 20 is illustrated in FIG. 4. As shown in the figure, the MCAM 20 comprises a cell i that contains a plurality of scan compare units SCU1 to SCUi. Since the structure and operation of the scan compare unit SCU1 are the same as the structure and operation of the units SCU2 to SCUi, only the unit SCU1 will be described in detail for the sake of brevity. The unit SCU1 comprises an opcode register 600, a minimum value register 602, a maximum value register 604, a programmable comparator 606, and a pull down transistor 608. The register 602 stores a minimum data value, and the register 604 stores a maximum data value. The opcode register 600 stores an opcode that instructs the programmable comparator 606 to operate in a particular mode. For example, if the register 600 stores a "span include" opcode, the comparator 606 determines if data in a field of a data packet header falls within a data range defined by the minimum and maximum data values stored in the registers 602 and 604. If the data falls within the data range, the comparator 606 does not turn ON the transistor 608, and the hit line i is not connected to ground. In contrast, if the data falls outside the data range, the comparator 606 turns ON the transistor 608 to connect the hit line i to ground. In other words, the SCU1 operates in a manner that is similar to the span compare units SCU1 to SCU5 of the previous embodiment.

However, if the register 600 stores a "span exclude" opcode, the comparator 606 determines if data in a field of the data packet header falls within a data range defined by the minimum and maximum data values stored in the registers 602 and 604. If the data falls within the data range, the comparator 606 turns ON the transistor 608 to connect the hit line i to ground. However, if the data falls outside the data range, the comparator 606 does not turn ON the transistor 608, and the hit line i is not connected to ground.

Accordingly, in the present embodiment, the cell i of the MCAM 20 can be programmed to operate in a "span include" mode to classify data packets as an i-th type data packets if the data in the header falls inside certain data ranges. Also, the cell i can be programmed to operate in a "span exclude" mode to alternatively classify data packets as the i-th type of data packets if the data in the header falls outside the certain data ranges. Also, although not specifically described above, the cell i disclosed in FIG. 2 can easily be modified to operate in a "span exclude" mode. In particular, the comparators 104, 106, 204, 206, 304, 306, 404, 406, 504, and 506 clearly can be modified so that the scan compare units SCU1 to SCU5 connect the hit line i to ground when the data in the header fields fall outside the data ranges stored in the units SCU1 to SCU5.

As described above, the MCAM 20 can quickly and accurately classify data packets according to a large number of rules. Specifically, each cell of the MCAM 20 classifies a data packet according to a particular rule via a simple comparison operation. As a result, the MCAM 20 does have to use a processor that classifies a data packet via time consuming processing routines. Also, the data from a data packet is simultaneously input a plurality of cells of the MCAM 20, and the cells simultaneously classify the data packet according to their respective rules. Thus, the time required to classify the data packet according to one rule is the same as the time. required to classify the data packet according to many rules. As a result, the time required to classify data packets does not increase as the number of rules contained in the MCAM 20 increases, and thus, the MCAM 20 can classify data packets based on an extremely large number of rules at an extremely high speed.

Also, as described above, each of the scan compare units SCU1 to SCU5 determines whether data from the header HDR falls within a specific range of values. However, one or more of the unit SCU1 to SCU5 (e.g. SCU1) may determine whether or data in the header HDR equals a particular data value by setting both of the maximum and minimum values stored in the registers (e.g. the registers 100 and 102) equal to the particular value.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. For example, the structure of the MCAM 20 shown in FIG. 2 can be modified in many ways without changing its basic operation. For instance, as shown in the figure, the scan compare unit SCU1 contains two pull down transistors 108 and 110 that electrically connect the hit line i to ground based on the outputs of the comparators 104 and 106. However, the outputs of the comparators 104 and 106 could alternatively be supplied to an OR gate, and the output of the OR gate could be supplied to a single pull down transistor that selectively connects the hit line i to ground. As a result, one of the pull down transistors 108 and 110 could be eliminated from the unit SCU1.

In addition, as shown in FIG. 2, the outputs of the comparators 104, 106, 204, 206, 304, 306, 404, 406, 504, and 506 are connected to the hit line via pull down transistors 108, 110, 208, 210, 308, 310, 408, 410, 508, and 510. However, the outputs of the comparators 104, 106, 204, 206, 304, 306, 404, 406, 504, and 506 could be supplied to an AND gate circuit that outputs a logic "1" to the hit line i if the classification rule stored in the cell i is satisfied.

Therefore, the present invention is not intended to be limited to the embodiments described herein but is to be accorded the widest scope as defined by the claims and equivalents thereof.

What is claimed is:

1. A device for classifying input data, comprising:
   a first memory unit that stores a first maximum data value and a first minimum data value, wherein said first maximum data value and said first minimum data value define a first data range; and
   a first comparison circuit that inputs first data, said first minimum data value, and said first maximum data and determines a first relationship between said first data and said first data range, wherein said first comparison circuit outputs a first comparison signal based on said first relationship,
   wherein said first data corresponds to at least a first portion of said input data,
   wherein said first comparison signal corresponds to a classification of said input data, and
   wherein said first comparison circuit comprises:
      a first programmable comparator that compares said first minimum data value and said first data and outputs said first comparison signal based on a relationship between said first minimum data value and said first data; and
      a first opcode memory unit that is coupled to said first programmable comparator and that stores an opcode,
      wherein said first opcode memory unit instructs said first programmable comparator to operate in a first comparison mode when said opcode has a first opcode value and instructs said first programmable comparator to operate in a second comparison mode when said opcode has a second opcode value.

2. The device as claimed in claim 1, wherein, when said opcode has said first opcode value, said first programmable comparator outputs said first comparison signal having a first logical value when said first data is within said first data range and outputs said first comparison signal having a second logical value when said first data is outside said first data range, and
   wherein, when said opcode has said second opcode value, said first programmable comparator outputs said first comparison signal having said second logical value when said first data is within said first data range and outputs said first comparison signal having said first logical value when said first data is outside said first data range.

3. The device as claimed in claim 2, wherein said input data is not classified according to a first rule, which is at least partially defined by said first minimum data value and said first maximum data value stored in said first memory unit, when said first comparison signal has said first logical state.

4. A classification device for classifying input data comprising first data and second data, comprising:
   a first memory unit that stores a first maximum data value and a first minimum data value, wherein said first maximum data value and said first minimum data value define a first data range;
   a second memory unit that stores a second maximum data value and a second minimum data value, wherein said second maximum data value and said second minimum data value define a second data range;

a first comparison circuit that inputs said first data, said first minimum data value, and said first maximum data value, determines whether or not said first data and said first data range have a first predetermined relationship, and outputs a corresponding first comparison signal;

a second comparison circuit that inputs said second data, said second minimum data value, and said second maximum data value and determines whether or not said second data and said second data range have a second predetermined relationship, wherein said second comparison circuit outputs a second comparison signal when said second data and said second data range have said second predetermined relationship;

a first hit line, wherein said first hit line is coupled to said first comparison circuit and said second comparison circuit and is forced to a first logical value when said first comparison signal indicates that said first predetermined relationship is not satisfied or said second comparison signal indicates that said second predetermined relationship is not satisfied;

a third memory unit that stores a third maximum data value and a third minimum data value, wherein said third maximum data value and said third minimum data value define a third data range;

a fourth memory unit that stores a fourth maximum data value and a fourth minimum data value, wherein said fourth maximum data value and said fourth minimum data value define a fourth data range;

a third comparison circuit that inputs said first data, said third minimum data value, and said third maximum data value, determines whether or not said first data and said third data range have a third predetermined relationship, and outputs a corresponding third comparison signal;

a fourth comparison circuit that inputs said second data, said fourth minimum data value, and said fourth maximum data value, determines whether or not said second data and said fourth data range have a fourth predetermined relationship, and outputs a fourth comparison signal; and a second hit line, wherein said second hit line is coupled to said third comparison circuit and said fourth comparison circuit and is forced to said first logical value when said third comparison signal indicates that said third predetermined relationship is not satisfied or said fourth comparison signal indicates that said fourth predetermined relationship is not satisfied, wherein said first memory unit, said second memory unit, said first comparison circuit, said second comparison circuit, and said first hit line define a first cell of said classification device;

wherein said first predetermined relationship and said second predetermined relationship define a first classification rule of said first cell;

wherein said classification device does not classify said input data according to said first classification rule when said first hit line has said first logical value and classifies said input data according to said first classification rule when said first hit line has a second logical value;

wherein said third memory unit, said fourth memory unit, said third comparison circuit, said fourth comparison circuit, and said second hit line define a second cell of said classification device;

wherein said third predetermined relationship and said fourth predetermined relationship define a second classification rule of said second cell;

wherein said classification device does not classify said input data according to said second classification rule when said second hit line has said first logical value and classifies said input data according to said second classification rule when said second hit line has said second logical value;

wherein said first comparison circuit comprises:
  a first programmable comparator that compares said first data range and said first data and outputs said first comparison signal based on a relationship between said first data range and said first data; and
  a first opcode memory unit that is coupled to said first programmable comparator and that stores a first opcode,
  wherein said first opcode memory unit instructs said first programmable comparator to operate in a first comparison mode when said opcode has a first opcode value and instructs said first programmable comparator to operate in a second comparison mode when said opcode has a second opcode value, and wherein said second comparison circuit comprises:
  a second programmable comparator that compares said second data range and said second data and outputs said second comparison signal based on a relationship between said second data range and said second data; and
  a second opcode memory unit that is coupled to said second programmable comparator and that stores a second opcode, and
  wherein said second opcode memory unit instructs said second programmable comparator to operate in said first comparison mode when said second opcode has said first opcode value and instructs said second programmable comparator to operate in said second comparison mode when said second opcode has said second opcode value.

5. The device as claimed in claim 4, wherein, when said first opcode has said first opcode value, said first programmable comparator outputs said first comparison signal indicating that said first predetermined relationship is satisfied when said first data is within said first data range and outputs said first comparison signal indicating that said first predetermined relationship is not satisfied when said first data is outside said first data range, wherein, when said first opcode has said second opcode value, said first programmable comparator outputs said first comparison signal indicating that said first predetermined relationship is not satisfied when said first data is within said first data range and outputs said first comparison signal indicating that said first predetermined relationship is satisfied when said first data is outside said first data range, wherein, when said second opcode has said first opcode value, said second programmable comparator outputs said second comparison signal indicating that said second predetermined relationship is satisfied when said second data is within said second data range and outputs said second comparison signal indicating that said second predetermined relationship is not satisfied when said second data is outside said second data range, wherein, when said second opcode has said second opcode value, said second programmable comparator outputs said second comparison signal indicating that said second predetermined relationship is not satisfied when said second data is within said second data range and outputs said second comparison signal indicating that said second predetermined relationship is satisfied when said second data is outside said second data range.

6. A classification device for classifying input data comprising first data and second data, comprising:

a first memory unit that stores a first maximum data value and a first minimum data value, wherein said first maximum data value and said first minimum data value define a first data range;

a second memory unit that stores a second maximum data value and a second minimum data value, wherein said second maximum data value and said second minimum data value define a second data range;

a first comparison circuit that inputs said first data, said first minimum data value, and said first maximum data value, determines whether or not said first data and said first data range have a first predetermined relationship, and outputs a corresponding first comparison signal;

a second comparison circuit that inputs said second data, said second minimum data value, and said second maximum data value and determines whether or not said second data and said second data range have a second predetermined relationship, wherein said second comparison circuit outputs a second comparison signal when said second data and said second data range have said second predetermined relationship;

a first hit line, wherein said first hit line is coupled to said first comparison circuit and said second comparison circuit and is forced to a first logical value when said first comparison signal indicates that said first predetermined relationship is not satisfied or said second comparison signal indicates that said second predetermined relationship is not satisfied;

a third memory unit that stores a third maximum data value and a third minimum data value, wherein said third maximum data value and said third minimum data value define a third data range;

a fourth memory unit that stores a fourth maximum data value and a fourth minimum data value, wherein said fourth maximum data value and said fourth minimum data value define a fourth data range;

a third comparison circuit that inputs said first data, said third minimum data value, and said third maximum data value, determines whether or not said first data and said third data range have a third predetermined relationship, and outputs a corresponding third comparison signal;

a fourth comparison circuit that inputs said second data, said fourth minimum data value, and said fourth maximum data value, determines whether or not said second data and said fourth data range have a fourth predetermined relationship, and outputs a fourth comparison signal;

a second hit line, wherein said second hit line is coupled to said third comparison circuit and said fourth comparison circuit and is forced to said first logical value when said third comparison signal indicates that said third predetermined relationship is not satisfied or said fourth comparison signal indicates that said fourth predetermined relationship is not satisfied, and a recording circuit that is connected to said first hit line and said second hit line, wherein said first memory unit, said second memory unit, said first comparison circuit, said second comparison circuit, and said first hit line define a first cell of said classification device;

wherein said first predetermined relationship and said second predetermined relationship define a first classification rule of said first cell;

wherein said classification device does not classify said input data according to said first classification rule when said first hit line has said first logical value and classifies said input data according to said first classification rule when said first hit line has a second logical value;

wherein said third memory unit, said fourth memory unit, said third comparison circuit, said fourth comparison circuit, and said second hit line define a second cell of said classification device;

wherein said third predetermined relationship and said fourth predetermined relationship define a second classification rule of said second cell;

wherein said classification device does not classify said input data according to said second classification rule when said second hit line has said first logical value and classifies said input data according to said second classification rule when said second hit line has said second logical value;

wherein said recording circuit records when said input data is classified according to said first classification rule based whether or not said first hit line has said first logical value or said second logical valued; and wherein said recording circuit records when said input data is classified according to said second classification rule based whether or not said second hit line has said first logical value or said second logical value.

7. The classification device as claimed in claim 6, wherein the input data is a first type of input data when said input data is classified according to said first classification rule and is a second type of input data when said input data is classified according to said second classification rule, and wherein said recording circuit prioritizes said first and second classification rules such that, when said input data is classified according to both said first and second classification rules, said recording circuit causes said input data to be processed as said first type of input data.

8. A classification device for classifying input data comprising first data and second data, comprising:

a first memory unit that stores a first maximum data value and a first minimum data value, wherein said first maximum data value and said first minimum data value define a first data range;

a second memory unit that stores a second maximum data value and a second minimum data value, wherein said second maximum data value and said second minimum data value define a second data range;

a first comparison circuit that inputs said first data, said first minimum data value, and said first maximum data value, determines whether or not said first data and said first data range have a first predetermined relationship, and outputs a corresponding first comparison signal;

a second comparison circuit that inputs said second data, said second minimum data value, and said second maximum data value and determines whether or not said second data and said second data range have a second predetermined relationship, wherein said second comparison circuit outputs a second comparison signal when said second data and said second data range have said second predetermined relationship;

a first hit line, wherein said first hit line is coupled to said first comparison circuit and said second comparison circuit and is forced to a first logical value when said first comparison signal indicates that said first predetermined relationship is not satisfied or said second comparison signal indicates that said second predetermined relationship is not satisfied;

a third memory unit that stores a third maximum data value and a third minimum data value, wherein said third maximum data value and said third minimum data value define a third data range;

a fourth memory unit that stores a fourth maximum data value and a fourth minimum data value, wherein said fourth maximum data value and said fourth minimum data value define a fourth data range;

a third comparison circuit that inputs said first data, said third minimum data value, and said third maximum data value, determines whether or not said first data and said third data range have a third predetermined relationship, and outputs a corresponding third comparison signal;

a fourth comparison circuit that inputs said second data, said fourth minimum data value, and said fourth maximum data value, determines whether or not said second data and said fourth data range have a fourth predetermined relationship, and outputs a fourth comparison signal; and a second hit line, wherein said second hit line is coupled to said third comparison circuit and said fourth comparison circuit and is forced to said first logical value when said third comparison signal indicates that said third predetermined relationship is not satisfied or said fourth comparison signal indicates that said fourth predetermined relationship is not satisfied, wherein said first memory unit, said second memory unit, said first comparison circuit, said second comparison circuit, and said first hit line define a first cell of said classification device;

wherein said first predetermined relationship and said second predetermined relationship define a first classification rule of said first cell;

wherein said classification device does not classify said input data according to said first classification rule when said first hit line has said first logical value and classifies said input data according to said first classification rule when said first hit line has a second logical value;

wherein said third memory unit, said fourth memory unit, said third comparison circuit, said fourth comparison circuit, and said second hit line define a second cell of said classification device;

wherein said third predetermined relationship and said fourth predetermined relationship define a second classification rule of said second cell;

wherein said classification device does not classify said input data according to said second classification rule when said second hit line has said first logical value and classifies said input data according to said second classification rule when said second hit line has said second logical value;

wherein the first cell further comprises a first logic circuit that inputs said first comparison signal and said second comparison signal and outputs a first hit line signal to the first hit line;

wherein said first hit line signal has said first logical value when said first comparison signal indicates that said first predetermined relationship is not satisfied or said second comparison signal indicates that said second predetermined relationship is not satisfied;

wherein the second cell further comprises a second logic circuit that inputs said third comparison signal and said fourth comparison signal and outputs a second hit line signal to the second hit line; and wherein said second hit line signal has said first logical value when said third comparison signal indicates that said third predetermined relationship is not satisfied or said fourth comparison signal indicates that said fourth predetermined relationship is not satisfied.

9. The classification device as claimed in claim 8, wherein said first hit line signal has said second logical value when both said first comparison signal indicates that said first predetermined relationship is satisfied and said second comparison signal indicates that said second predetermined relationship is satisfied, and wherein said second hit line signal has said second logical value when both said third comparison signal indicates that said third predetermined relationship is satisfied and said fourth comparison signal indicates that said fourth predetermined relationship is satisfied.

10. A classification device for classifying input data comprising first data and second data, comprising:

a first memory unit that stores a first maximum data value and a first minimum data value, wherein said first maximum data value and said first minimum data value define a first data range;

a second memory unit that stores a second maximum data value and a second minimum data value, wherein said second maximum data value and said second minimum data value define a second data range;

a first comparison circuit that inputs said first data, said first minimum data value, and said first maximum data value, determines whether or not said first data and said first data range have a first predetermined relationship, and outputs a corresponding first comparison signal;

a second comparison circuit that inputs said second data, said second minimum data value, and said second maximum data value and determines whether or not said second data and said second data range have a second predetermined relationship, wherein said second comparison circuit outputs a second comparison signal when said second data and said second data range have said second predetermined relationship;

a first hit line, wherein said first hit line is coupled to said first comparison circuit and said second comparison circuit and is forced to a first logical value when said first comparison signal indicates that said first predetermined relationship is not satisfied or said second comparison signal indicates that said second predetermined relationship is not satisfied;

a third memory unit that stores a third maximum data value and a third minimum data value, wherein said third maximum data value and said third minimum data value define a third data range; a fourth memory unit that stores a fourth maximum data value and a fourth minimum data value, wherein said fourth maximum data value and said fourth minimum data value define a fourth data range;

a third comparison circuit that inputs said first data, said third minimum data value, and said third maximum data value, determines whether or not said first data and said third data range have a third predetermined relationship, and outputs a corresponding third comparison signal;

a fourth comparison circuit that inputs said second data, said fourth minimum data value, and said fourth maximum data value, determines whether or not said second data and said fourth data range have a fourth predetermined relationship, and outputs a fourth comparison signal; and a second hit line, wherein said second hit line is coupled to said third comparison circuit and said fourth comparison circuit and is forced to said first logical value when said third comparison signal indicates that said third predetermined relationship is not satisfied or said fourth comparison signal indicates that said fourth predetermined relationship is not satisfied, wherein said first memory unit, said second memory unit, said first comparison circuit, said second comparison circuit, and said first hit line define a first cell of said classification device;

wherein said first predetermined relationship and said second predetermined relationship define a first classification rule of said first cell;

wherein said classification device does not classify said input data according to said first classification rule when said first hit line has said first logical value and classifies said input data according to said first classification rule when said first hit line has a second logical value;

wherein said third memory unit, said fourth memory unit, said third comparison circuit, said fourth comparison circuit, and said second hit line define a second cell of said classification device;

wherein said third predetermined relationship and said fourth predetermined relationship define a second classification rule of said second cell;

wherein said classification device does not classify said input data according to said second classification rule when said second hit line has said first logical value and classifies said input data according to said second classification rule when said second hit line has said second logical value; and wherein said first cell further comprises a deactivation storage device that stores deactivation data and that is coupled to the first hit line, wherein said first hit line is forced to said first logical level when said deactivation data has a first deactivation data value, regardless of values of said first comparison signal and said second comparison signal.

11. A classifying device for receiving input data that comprises first data and second data and for classifying said input data based on the values of said first data and said second data, comprising:

a modified content addressable memory that comprises a first row and a second row, wherein said first row includes:
a first memory unit that stores a first minimum value and a first maximum value defining a first range;
a first compare circuit coupled to said first memory unit;
a second memory unit that stores a second minimum value and a second maximum value defining a second range; and a second compare circuit coupled to said second memory unit, wherein said second row includes:
a third memory unit that stores a third minimum value and a third maximum value defining a third range;
a third compare circuit coupled to said third memory unit;
a fourth memory unit that stores a fourth minimum value and a fourth maximum value defining a fourth range; and
a fourth compare circuit coupled to said fourth memory unit, wherein said first compare circuit inputs said first maximum and minimum values and said first data and determines whether or not said first data and said first range have a first relationship, wherein said second compare circuit inputs said second maximum and minimum values and said second data and determines whether or not said second data and said second range have a second relationship, wherein said third compare circuit inputs said third maximum and minimum values and said first data and determines whether or not said first data and said third range have a third relationship, and wherein said fourth compare circuit inputs said fourth maximum and minimum values and said second data and determines whether or not said second data and said fourth range have a fourth relationship.

12. The classifying device as claimed in claim 11, wherein said first row further comprises a first hit line and said second row further comprises a second hit line, wherein said first hit line outputs a first logic value when said first compare circuit determines that said first data and said first range have said first relationship and said second compare circuit determines that said second data and said second range have said second relationship, and wherein said first hit line outputs a second logic value when said first compare circuit determines that said first data and said first range do not have said first relationship or said second compare circuit determines that said second data and said second range do not have said second relationship.

13. The classifying device as claimed in claim 12, wherein said second hit line outputs said first logic value when said third compare circuit determines that said first data and said third range have said third relationship and said fourth compare circuit determines that said second data and said fourth range have said fourth relationship, and wherein said second hit line outputs said second logic value when said third compare circuit determines that said first data and said third range do not have said third relationship or said fourth compare circuit determines that said second data and said fourth range do not have said fourth relationship.

14. The classifying device as claimed in claim 13, wherein said first row further comprises:

a first transistor connected between said first hit line and a first voltage potential; and a second transistor connected between said first hit line and said first voltage potential, wherein said first compare circuit determines if said first data is less than said first minimum value and turns ON said first transistor when said first data is less than said first minimum value to electrically connect said first hit line to said first voltage potential and force said first hit line to output said second logic value, wherein said first compare circuit determines if said first data is greater than said first maximum value and turns ON said second transistor when said first data is greater than said first maximum value to electrically connect said first hit line to said first voltage potential and force said first hit line to output said second logic value.

15. The classifying device as claimed in claim 14, wherein said second row further comprises:
   a third transistor connected between said second hit line and said first voltage potential; and
   a fourth transistor connected between said second hit line and said first voltage potential,
   wherein said third compare circuit determines if said first data is less than said third minimum value and turns ON said third transistor when said first data is less than said third minimum value to electrically connect said second hit line to said first voltage potential and force said second hit line to output said second logic value,
   wherein said third compare circuit determines if said first data is greater than said third maximum value and turns ON said fourth transistor when said first data is greater than said third maximum value to electrically connect said second hit line to said first voltage potential and force said second hit line to output said second logic value.

16. The classifying device as claimed in claim 14, wherein said first row further comprises:
   a third transistor connected between said first hit line and said first voltage potential; and
   a fourth transistor connected between said first hit line and said first voltage potential,
   wherein said second compare circuit determines if said second data is less than said second minimum value and turns ON said third transistor when said second data is less than said second minimum value to electrically connect said first hit line to said first voltage potential and force said first hit line to output said second logic value,
   wherein said second compare circuit determines if said second data is greater than said second maximum value and turns ON said fourth transistor when said second data is greater than said second maximum value to electrically connect said first hit line to said first voltage potential and force said first hit line to output said second logic value.

17. The classifying device as claimed in claim 13, wherein said first row further comprises:
   a first logic circuit that is coupled between said first hit line and said first and second compare circuits,
   wherein said first compare circuit outputs at least a first comparison signal that indicates whether or not said first data and said first range have said first relationship,
   wherein said second compare circuit outputs at least a second comparison signal that indicates whether or not said second data and said second range have said second relationship,
   wherein said first logic circuit inputs said first and second comparison signals and outputs said first logic value to said first hit line when said first data and said first range have said first relationship and said second data and said second range have said second relationship, and
   wherein said first logic circuit outputs said second logic value to said first hit line when said first data and said first range do not have said first relationship or said second data and said second range do not have said second relationship.

18. The classifying device as claimed in claim 17, wherein said second row further comprises:
   a second logic circuit that is coupled between said second hit line and said third and fourth compare circuits,
   wherein said third compare circuit outputs at least a third comparison signal that indicates whether or not said first data and said third range have said third relationship,
   wherein said fourth compare circuit outputs at least a fourth comparison signal that indicates whether or not said second data and said fourth range have said fourth relationship,
   wherein said second logic circuit inputs said third and fourth comparison signals and outputs said first logic value to said second hit line when said first data and said third range have said third relationship and said second data and said fourth range have said fourth relationship, and
   wherein said second logic circuit outputs said second logic value to said second hit line when said first data and said third range do not have said third relationship or said second data and said fourth range do not have said fourth relationship.

19. The classifying device as claimed in claim 13, wherein said first compare circuit comprises:
   a first programmable comparator; and
   a first opcode memory that is connected to said first programmable comparator and that stores a first opcode,
   wherein said first programmable comparator operates in an include mode when said first opcode has a first opcode value and operates in an exclude mode when said first opcode has a second opcode value,
   wherein said second compare circuit comprises:
      a second programmable comparator; and
      a second opcode memory that is connected to said second programmable comparator and that stores a second opcode,
      wherein said second programmable comparator operates in said include mode when said second opcode has said first opcode value and operates in said exclude mode when said first opcode has said second opcode value,
      wherein said first hit line outputs said first logic value when (1) said first programmable comparator is operating in said include mode and determines that said first data falls within said first range and (2) said second programmable comparator is operating in said include mode and determines that said second data falls within said second range, and
      wherein said first hit line outputs said first logic value when (1) said first programmable comparator is operating in said exclude mode and determines that said first data falls outside said first range and (2) said second programmable comparator is operating in said exclude mode and determines that said second data falls outside said second range.

20. The classifying device as claimed in claim 19, wherein said third compare circuit comprises: a third programmable comparator; and
   a third opcode memory that is connected to said third programmable comparator and that stores a third opcode,
   wherein said third programmable comparator operates in said include mode when said third opcode has said first opcode value and operates in said exclude mode when said third opcode has said second opcode value, wherein said fourth compare circuit comprises:

a fourth programmable comparator; and a fourth opcode memory that is connected to said fourth programmable comparator and that stores a fourth opcode, wherein said fourth programmable comparator operates in said include mode when said fourth opcode has said first opcode value and operates in said exclude mode when said fourth opcode has said second opcode value, wherein said second hit line outputs said first logic value when (1) said third programmable comparator is operating in said include mode and determines that said first data falls within said third range and (2) said fourth programmable comparator is operating in said include mode and determines that said second data falls within said fourth range, and wherein said second hit line outputs said first logic value when (1) said third programmable comparator is operating in said exclude mode and determines that said first data falls outside said third range and (2) said fourth programmable comparator is operating in said exclude mode and determines that said second data falls outside said fourth range.

21. The classifying device as claimed in claim 13, wherein said first row further comprises a first deactivation circuit that stores first deactivation data and is coupled to said first hit line, wherein said first deactivation circuit forces said first hit line to output said second logic value when said first deactivation data has a deactivation value, regardless of whether said first data and said first range have said first relationship or said second data and said second range have said second relationship.

22. The classifying device as claimed in claim 21, wherein said second row further comprises a second deactivation circuit that stores second deactivation data and is coupled to said second hit line, wherein said second deactivation circuit forces said second hit line to output said second logic value when said second deactivation data has said deactivation value, regardless of whether said first data and said third range have said third relationship or said second data and said fourth range have said fourth relationship.

23. A content addressable memory device for classifying input data, comprising:

a plurality of rows respectively connected to a plurality of hit lines, wherein each of said plurality of rows comprises a plurality of span compare units and wherein each of said plurality of span compare units comprises:

a corresponding memory unit that stores a corresponding maximum data value and a corresponding minimum data value, wherein said corresponding maximum data value and said corresponding minimum data value define a corresponding data range; and a corresponding comparison circuit that inputs at least a corresponding portion of said input data, said corresponding minimum data value, and said corresponding maximum data value and determines a corresponding relationship between said corresponding portion of said input data and said corresponding data range, wherein said corresponding comparison circuit outputs a corresponding comparison signal to a corresponding hit line of said plurality of hit lines based on said corresponding relationship and wherein said corresponding comparison signal relates to a classification of said input data.

24. The device as claimed in claim 23, wherein said corresponding comparison circuit contained in each of said plurality of span compare units, comprises:

a minimum data comparator that compares said corresponding minimum data value and said corresponding portion of said input data and outputs a minimum data sub-comparison signal based on a relationship between said corresponding minimum value and said corresponding portion of said input data; and a maximum data comparator that compares said corresponding maximum data value and said corresponding portion of said input data and outputs a maximum data sub-comparison signal based on a relationship between said corresponding maximum data value and said corresponding portion of said input data, wherein said corresponding comparison signal comprises said minimum data sub-comparison signal and said maximum data sub-comparison signal.

25. The device as claimed in claim 24, wherein said minimum data comparator outputs said minimum data sub-comparison signal having a first logical value when said corresponding portion of said input data is greater than said corresponding minimum data value and outputs said minimum data sub-comparison signal having a second logical value when said corresponding portion of said input data is less than said corresponding minimum data value, and wherein said maximum data comparator outputs said maximum data subcomparison signal having said second logical value when said corresponding portion of said input data is greater than said corresponding maximum data value and outputs said maximum data sub-comparison signal having said first logical value when said corresponding portion of said input data is less than said corresponding maximum data value.

26. The device as claimed in claim 25, wherein said input data is not classified according to a corresponding rule, which is at least partially defined by said corresponding minimum data value and said corresponding maximum data value stored in said corresponding memory unit, when one of said minimum data subcomparison signal and said maximum data sub-comparison signal has said second logical value.

27. The device as claimed in claim 25, wherein said input data is not classified according to a corresponding rule, which is at least partially defined by said corresponding minimum data value and said corresponding maximum data value stored in said corresponding memory unit, when both said minimum data sub-comparison signal and said maximum data sub-comparison signal have said first logical value.

28. The device as claimed in claim 23, wherein said corresponding comparison circuit comprises:

a corresponding programmable comparator that compares said corresponding data range and said corresponding portion of said input data and outputs said corresponding comparison signal based on a relationship between said corresponding data range and said corresponding portion of said input data; and a corresponding opcode memory unit that is coupled to said corresponding programmable comparator and that stores an opcode, wherein said corresponding opcode memory unit instructs said corresponding programmable comparator to operate in a first comparison mode when said opcode has a first opcode value and instructs said corresponding programmable comparator to operate in a second comparison mode when said opcode has a second opcode value.

29. The device as claimed in claim 28, wherein, when said opcode has said first opcode value, said corresponding programmable comparator outputs said corresponding comparison signal having a first logical value when said corresponding portion of said input data is within said corresponding data range and outputs said corresponding comparison signal having a second logical value when said corresponding portion of said input data is outside said corresponding data range, and wherein, when said opcode has said second opcode value, said corresponding programmable comparator outputs said corresponding comparison signal having said second logical value when said corresponding portion of said input data is within said corresponding data range and outputs said corresponding comparison signal having said first logical value when said corresponding portion of said input data is outside said corresponding data range.

30. The device as claimed in claim 29, wherein said input data is not classified according to a corresponding rule, which is at least partially defined by said corresponding minimum data value and said corresponding maximum data value stored in said corresponding memory unit, when said corresponding comparison signal has said first logical value.

31. The device as claimed in claim 23, wherein said plurality of span compare units in each of said plurality of rows comprises at least five span compare units.

32. The device as claimed in claim 24, wherein said plurality of span compare units in each of said plurality of rows comprises at least five span compare units.

33. The device as claimed in claim 28, wherein said plurality of span compare units in each of said plurality of rows comprises at least five span compare units.

* * * * *